Dec. 24, 1929.  E. G. GLICK  1,741,105
SPARE TIRE COVER
Filed July 9, 1927
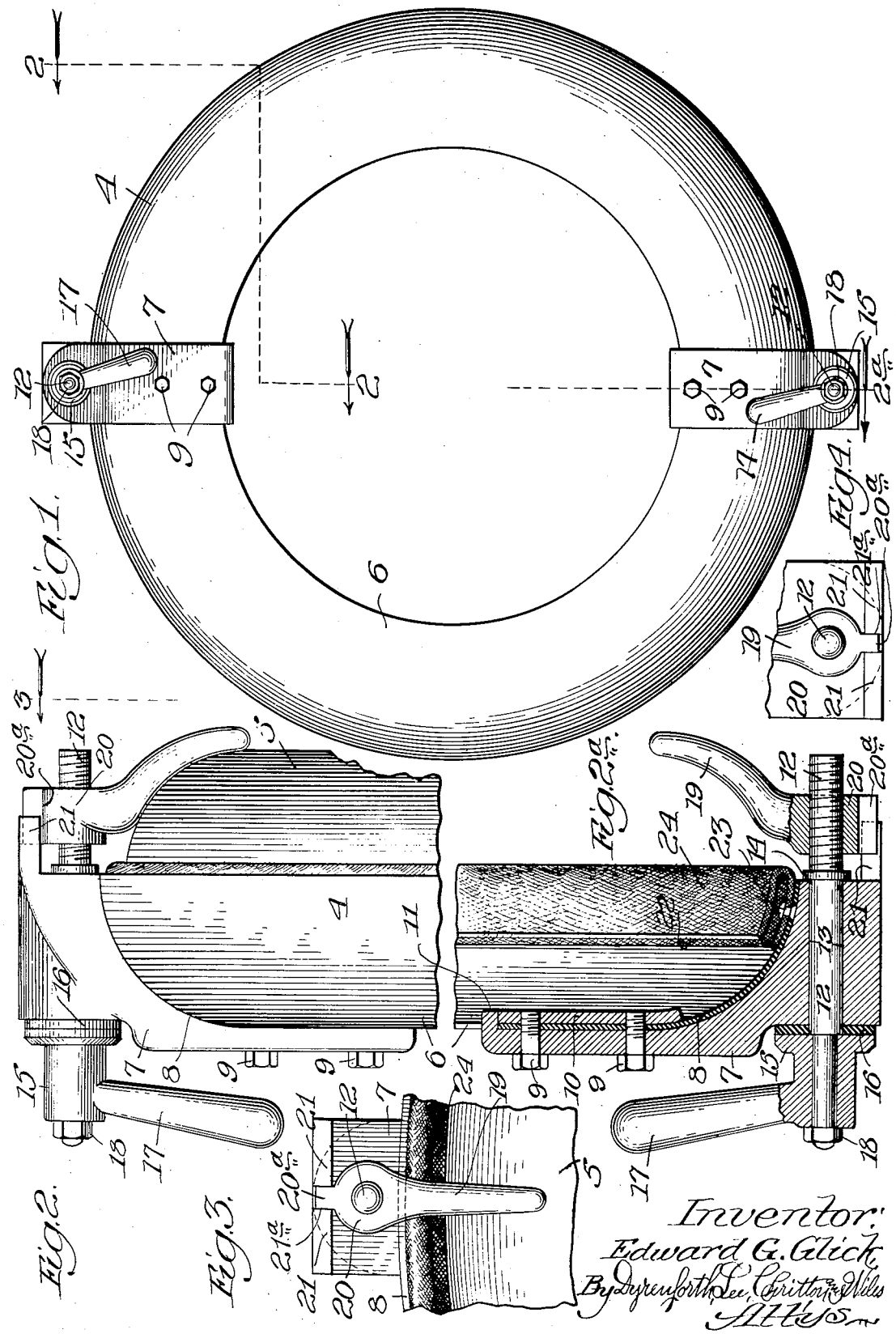
Inventor:
Edward G. Glick,
By Dyrenforth, Lee, Chritton & Wiles
Attys.

Patented Dec. 24, 1929

1,741,105

UNITED STATES PATENT OFFICE

EDWARD G. GLICK, OF CHICAGO, ILLINOIS

SPARE-TIRE COVER

Application filed July 9, 1927. Serial No. 204,472.

My object, generally stated, is to provide a cover for spare tires carried on automobiles which will present a neat appearance, be economical of construction, and be readily applied to position on the tire and removed therefrom at will.

Referring to the accompanying drawing:—

Figure 1 is a face view of my improved tire cover showing it applied to a spare tire. Figure 2 is an enlarged edge view of the combined tire and cover, the view being taken at the irregular line 2—2 on Fig. 1 and viewed in the direction of the arrows. Figure 2ª is a broken, enlarged sectional view taken at the line 2ª on Fig. 1 and viewed in the direction of the arrow with the tire omitted. Figure 3 is a fragmentary view of the rear side of the upper portion of the combined tire and cover, viewed from the line 3 on Fig. 2 and in the direction of the arrow; and Fig. 4, a similar view of the rear side of the lower portion of the cover, viewed from the line 4 on Fig. 2 and in the direction of the arrow.

My improved tire cover comprises a rigid member 4 in the form of an annulus of a diameter and width sufficient to extend entirely over the outer surface of the tire to be covered, as for example that represented at 5. This annulus, which by preference is formed of sheet metal, is rearwardly curved at its outer periphery and throughout its circumference, as represented, to cause it to substantially conformingly fit the outer rearwardly curving surface of the tire, the inner peripheral margin of the member 4 and represented at 6, being preferably flat.

The member 4 is provided on its front side at diametrically opposed portions thereof with brackets 7 which are recessed at their rear sides, as represented at 8 to conformingly fit the member 4 and beyond which they radially extend to overlap the side surfaces of the member 4. These brackets are shown as secured to the member 4 by means of screws 9 which pass through the inner ends of the brackets 7, the inner peripheral portion of the member 4 and into plates 10 located to the rear of the member 4, the inner ends of the brackets 7 being preferably provided with rearwardly extending lugs 11 which overlap the inner marginal edge of the member 4 and the inner edges of the plates 10.

The brackets 7 form supports for clamping devices by which the cover is releasably secured to the tire. Each of these clamping devices comprises a stud rotatably mounted in an opening 13 in the bracket and held against lengthwise movement therein by a collar 14 at the rear end of the stud and a head 15 at the front end of the stud, a washer 16 being confined between the bracket and the head 15. The head 15 which is provided with a handle portion 17 is shown as in the form of a nut screwed on the outer end of the stud 12 and held in place thereon by a nut 18 applied to the stud. Each stud at its rear end is provided with a clamping jaw 19 having a nut portion 20 threaded on the rear, threaded, end of the stud 12, these jaws when in a position to clamp the tire extending at lugs 20ª thereon into slots 21ª in rearwardly-projecting flanges 21 on the brackets 7, and thus in interlocking relation with these brackets to prevent the turning of the jaws 19.

The rear edge portion of the member 4 is provided internally with a strip 22 of flexible material, as for example canvas which is secured at one edge portion, to the member 4 at intervals about the latter, as through the medium of rivets 23 one only of which is shown. The free edge of the strip 22 is turned inwardly and forwardly throughout the circumference of the member 4 to provide the free portion 24 at which the cover bears against the outer peripheral portion of the tire when the cover is positioned thereon and ensures tightness of fit of the cover on the tire regardless of slight variations in tires of the size for use with which the cover is provided.

As will be understood, the tire to be equipped with the cover is supported on the automobile in any desirable way such, as for example, in accordance with common practice, no supporting means for the tire being shown.

To condition the parts of the cover for application to a tire the operator rotates the studs 12 until the clamps 19 have been shifted on these studs to a position in which they extend rearwardly beyond the lugs 21. The cover is then placed on the tire to the position shown in the drawings and the clamps 19 rotated to overlap the rear surface of the tire as shown. The studs 12 are then rotated to draw the clamps 19 and the member 4 together into embracing position on the tire, it being understood that in thus relatively adjusting the clamps 19 and the member 4, the clamps 19 will move into a position in which the lugs 20ª extend into the slots 21, thereby preventing the clamps 19 from rotating out of the desired position in the operation of tightening the cover against a tire by rotation of the heads 15.

While I have illustrated and described a particular construction embodying my invention, I do not wish to be understood as intending to limit it thereto as various alterations and changes in the construction shown may be made without departing from the spirit of my invention.

What I claim as new and desire to secure by Letters Patent, is:

1. A tire-cover comprising a cover-member adapted to be applied to a face of the tire, and clamps including a rotatable and a longitudinally displaceable element operatively supported by said member and adapted to engage the rear portion of the tire.

2. A tire-cover comprising a cover-member adapted to be applied to a face of the tire, studs pivotally associated with said member, and clamps operatively associated with said studs and adapted to clamp against the rear portion of the tire upon actuating said studs.

3. A tire-cover comprising a cover-member adapted to be applied to a face of the tire, threaded studs pivotally assocated with said member and clamps engaging the threaded portions of said studs and adapted to clamp against the rear portion of the tire.

4. A tire-cover comprising a cover-member adapted to be applied to a face of the tire, threaded studs pivotally associated with said member, clamps engaging the threaded portions of said studs and adapted to clamp against the rear portion of the tire, and means on said member preventing rotation of said clamps during the clamping operation.

5. A tire-cover comprising a cover-member adapted to be applied to a face of the tire, threaded studs pivotally associated with said member, clamps engaging the threaded portions of said studs and adapted to clamp against the rear portion of the tire, and flanges on said member opposing said clamps during the clamping operation and with which said clamps engage to prevent rotation of the latter.

6. A tire-cover comprising a cover-member adapted to be applied to a face of the tire, threaded studs pivotally associated with said member, clamps engaging the threaded portions of said studs and adapted to clamp against the rear portion of the tire, flanges on said member containing slots, and lugs on said clamps extending into said slots during the clamping operation to prevent rotation of said clamps.

7. A tire-cover comprising a cover-member adapted to be applied to a face and tread part of the tire, means for securing said member to a tire, and a yieldable filler strip on said member with which the tread part of the tire engages to compensate for variations in sizes of tires.

8. A tire-cover comprising a cover-member adapted to be applied to a face of the tire, means for securing said member to a tire, and a strip of yieldable material secured along its one edge to the rear edge of said member and deflected to extend into a position to be engaged by the tire when the cover is applied to the latter.

9. A tire-cover comprising a cover-member adapted to be applied to a face of the tire, means for securing said member to a tire and a strip of yieldable material secured along one edge to the inner surface of the rear portion of said member and deflected inwardly and forwardly to extend into a positon to be engaged by the tire when the cover is applied to the latter.

10. A tire cover having a body with a face portion adapted to fit over the face of the tire and a rearwardly curved portion adapted to fit over the tire tread surface, bracket members carried by said body, clamp studs carried by said brackets, clamp elements carried by said studs and adapted to be associated with the rearward portion of the tire.

11. A tire cover having a body with a face portion adapted to fit over the face of the tire and a rearwardly curved portion adapted to fit over the tire tread surface, bracket members carried by said body, clamp studs carried by said brackets, clamp elements carried by said studs, and means for preventing rotation of said elements relative to said studs in one position and permitting of rotation thereof in another position.

12. A tire cover having a body with a face portion adapted to fit over the face of the tire and a rearwardly curved portion adapted to fit over the tire tread surface, bracket members carried by said body, clamp studs carried by said brackets, clamp elements carried by said studs and adapted to be associated with the rearward portion of the tire and means for preventing rotation of said elements relative to said studs when in their tire-engaging position and permitting of rotation thereof in their tire-disengaging position.

13. A metal tire cover comprising a body portion shaped to fit over the tread and face of the tire, fastening devices carried by said body rendering the same self-supported upon the spare tire, said devices including a clamping jaw non-rotatably supported in engagement with the rear of the tire in its tire-fastening position and rotatably supported in a position disengaged from the tire, and means for adjusting said jaw to and from its tire-engaging position.

14. A metal tire cover adapted to be mounted upon and removed from a spare tire without removing the latter from the position in which it is supported by the vehicle including a body having integral tire tread and face covering portions, and fastening means carried by said body and associated with the rear of the tire, including clamp elements which when released are rotatable away from the tire to permit the body portion to be removed therefrom.

15. A metal tire cover adapted to be mounted upon and removed from a spare tire without removing the latter from the position in which it is supported by the vehicle including a body having integral tire tread and face covering portions, and fastening means carried by said body and associated with the rear of the tire, including a bracket fixed upon the body, a clamp stud carried by said bracket, a clamp element carried by said stud, said element being adjustable axially relative to said stud toward and from the rear of the tire, and means for adjusting said element back and forth and means for rendering said element non-rotatable in certain positions and rotatable in other positions.

16. In a tire cover, a covering member, and means for supporting said member in covering position on the tire which comprises a bracket, a stud mounted on said bracket for rotation but held against longitudinal movement, a clamp element carried by said stud and engageable with the tire, and means holding said element non-rotatable in one position as said stud is rotated to feed said element axially of said stud.

17. In a tire cover, a covering part, and means for clamping said part upon the tire which includes a clamp member mounted upon said part for rotation, a clamp element carried by said member and engageable with the tire, and means for feeding said element toward and from the tire as said member is rotated and adapted to release said element in a predetermined position for movement of said element to a position permitting of removal of the cover from the tire.

18. In a tire cover, a covering part, and means for clamping said part upon the tire which includes a clamp member mounted upon said part for rotation, a clamp element carried by said member and engageable with the tire, said member having an open-end, slotted part engageable by said element for feeding said element toward and from the tire as said member is rotated and for releasing said element from said member in a predetermined position for movement of said element to a position wherein the tire cover may be removed from the tire.

19. In a tire cover having a body of size and shape to extend over side wall and tread portions of the tire, a bracket carried by the body, a stud member journaled in the bracket, and a clamp device engageable with the tire and mounted upon said stud, and means for preventing rotation of said clamp device as said stud is rotated, said means being capable of releasing said clamp member in a predetermined position to permit swinging of the clamp member to a position permitting withdrawal of the tire cover body from the tire.

EDWARD G. GLICK.